(No Model.)
J. N. & T. WALLIS.
HORSE HAY RAKE.
No. 292,776. Patented Jan. 29, 1884.
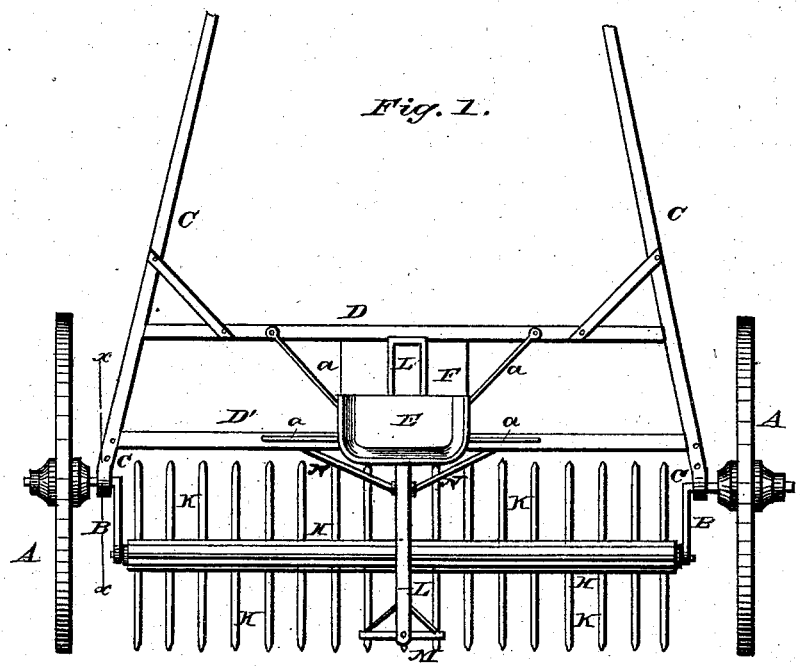
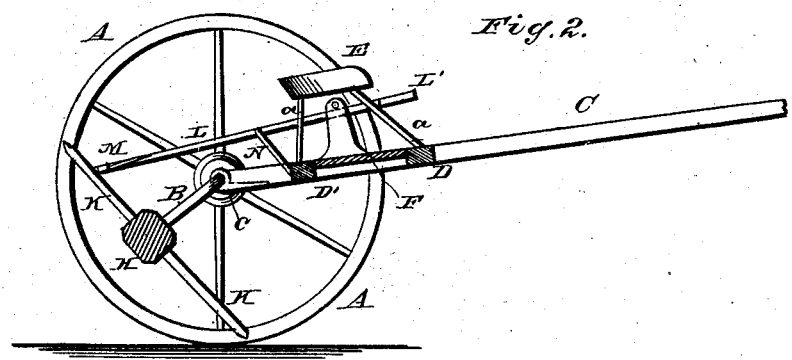
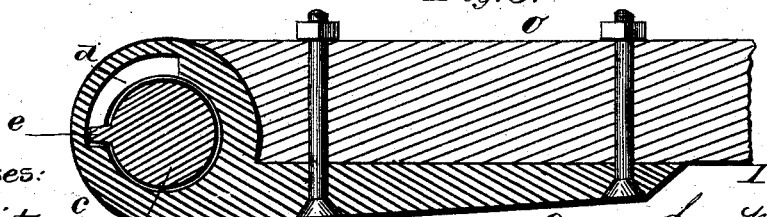

UNITED STATES PATENT OFFICE.

JOHN N. WALLIS, OF FLEMING, AND THEODORE WALLIS, OF SCIPIO, ASSIGNORS OF ONE-HALF TO WASHINGTON S. CHAMBERLAIN, OF AUBURN, N. Y.

HORSE HAY-RAKE.

SPECIFICATION forming part of Letters Patent No. 292,776, dated January 29, 1884.

Application filed August 4, 1883. (No model.)

*To all whom it may concern:*

Be it known that we, J. N. WALLIS, of Fleming, and THEO. WALLIS, of Scipio, in the county of Cayuga and State of New York, have invented certain new and useful Improvements in Horse Hay-Rakes; and we do hereby declare that the following is a full, clear, and exact description thereof, reference being had to the accompanying drawings, and to the letters of reference marked thereon, which form a part of this specification, in which—

Figure 1 is a top view of our improved horse hay-rake. Fig. 2 is a section taken vertically and longitudinally through the center of the same. Fig. 3 is a vertical section in the plane indicated by dotted line $x\ x$.

This invention relates to horse hay-rakes, wherein a revolving rake mounted on wheels is employed; and it consists in suspending the rake from short cranked axles, and also in novel means whereby the driver can hold the rake in working position, and, when desired, trip the rake and allow it to turn and discharge its gathered load in a windrow, as will be fully understood from the following description when taken in connection with the annexed drawings.

A A designate two transporting-wheels, which are applied to turn freely on the horizontal portions of two cranked axles, B B. The crank-arms of the axles B B afford bearings for the metal journals of the rake-head H. This head is provided with two rows of teeth, K, fixed in the head diametrically opposite each other.

C C designate the thills, the thill-irons $c$ of which have eyes formed in them, in which the horizontal portions of the cranked axles B B are allowed to oscillate a little more than one-quarter of a revolution.

By reference to Fig. 3 it will be seen that the vibration of the axles, and consequently the rake, is limited by means of a feather, $e$, on the short axle working in a groove, $d$, in the eye of the thill-iron.

It will be observed from the above description that the rake is allowed to revolve in its bearings, and that it is also allowed to rise and fall bodily with the crank-arms of the axles.

When a load of hay has been gathered in front of the rakes and the attendant desires to discharge the load, he presses with his foot on a pedal, hereinafter described, and releases the rake from a lever, also hereinafter described. The rake will now make one-half of a revolution, necessarily rising bodily in order to do so. The thills are connected together in front of the axles B B by means of cross-bars D D', on which are mounted by rods $a$ the driver's seat E, having below it a foot-stand, F.

L designates a lever, which is provided with a pedal, L', on its front end, and which is arranged beneath the driver's seat. This lever L has its fulcrum on the braces N, which are secured to the cross-bar D' of the thills, and on the rear end of said lever a cross-piece, M, is rigidly secured, which may be of sufficient length to extend over three or more of the rake-teeth. By the said cross-bar coming in contact with the rake-teeth the rake is held in working position, as shown in Fig. 2 of the drawings.

Having described our invention, what we claim as new, and desire to secure by Letters Patent, is—

1. In a two-wheel horse hay-rake, the combination of a revolving rake, the cranked axles on which the rake-head is journaled, thills connected by eye-bearings to said axles, and devices for holding the rake to its work and tripping it, all constructed and adapted to operate substantially in the manner and for the purposes described.

2. The combination of a revolving rake, cranked axles affording bearings therefor, the feathers formed on the said axles, and grooves formed in the eyes of the thill-irons to limit the vertical vibration of the axles, all constructed and adapted to operate substantially in the manner and for the purposes described.

In testimony that we claim the foregoing as our own we affix our signatures in presence of two witnesses.

JOHN N. WALLIS.
THEODORE WALLIS.

Witnesses:
HORACE T. COOK,
GERRIT LOUGHBOROUGH.